(12) United States Patent
Chen et al.

(10) Patent No.: US 7,896,549 B2
(45) Date of Patent: Mar. 1, 2011

(54) PARALLEL SPACER FOR A LINEAR GUIDEWAY

(75) Inventors: Tsung-Jen Chen, Taichung (TW); Scotte Chen, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 365 days.

(21) Appl. No.: 12/204,110

(22) Filed: Sep. 4, 2008

(65) Prior Publication Data
US 2008/0317391 A1    Dec. 25, 2008

Related U.S. Application Data

(63) Continuation-in-part of application No. 11/245,822, filed on Oct. 7, 2005, now abandoned.

(51) Int. Cl.
*F16C 29/06* (2006.01)
(52) U.S. Cl. .............................................. 384/44; 384/51
(58) Field of Classification Search .............. 384/43–45, 384/51
See application file for complete search history.

(56) References Cited

U.S. PATENT DOCUMENTS

| | | | |
|---|---|---|---|
| 3,964,802 A | 6/1976 | Pitner | |
| 6,082,210 A * | 7/2000 | Ise | 74/424.83 |
| 6,390,678 B1 | 5/2002 | Shirai | |
| 6,626,572 B2 | 9/2003 | Teramachi | |
| 6,733,179 B2 * | 5/2004 | Michioka et al. | 384/44 |
| 6,997,078 B2 * | 2/2006 | Okita et al. | 74/424.88 |
| 2003/0128901 A1 * | 7/2003 | Yabe et al. | 384/45 |
| 2003/0138172 A1 * | 7/2003 | Yabe et al. | 384/45 |
| 2003/0231812 A1 * | 12/2003 | Hausberger et al. | 384/44 |
| 2004/0184685 A1 * | 9/2004 | Michioka et al. | 384/44 |
| 2004/0190801 A1 * | 9/2004 | Kato et al. | 384/51 |

FOREIGN PATENT DOCUMENTS

| | | |
|---|---|---|
| JP | 11-351254 | 12/1999 |
| JP | 3436708 | 8/2003 |

* cited by examiner

*Primary Examiner* — Thomas R Hannon

(57) ABSTRACT

A parallel spacer for a linear guideway comprises a plurality of parting portions, connecting portions and a retaining portion. Each of the parting portions is a thin member disposed between each pair of neighboring rollers. The connecting portions are employed to connect the parting portions and the retaining portion, and the retaining portion is arranged at a side of the respective rollers and located in an axial direction thereof, the retaining portion is an integral structure for connection with the respective connecting portions.

4 Claims, 6 Drawing Sheets

PARALLEL SPACER FOR A LINEAR GUIDEWAY

This application is a continuation of part of U.S. patent application Ser. No. 11/245,822 which claims the benefit of the earlier filing date of Oct. 7, 2005 now abandoned. Claim 1 of this application corresponds to claims 1-3 of the U.S. patent application Ser. No. 11/245,822, claim 3 of this application also corresponds to claims 1-3 of the U.S. patent application Ser. No. 11/245,822, and claims 2 and 4 of this application are new.

BACKGROUND OF THE INVENTION

1. Field of the Invention

The present invention relates to a spacer structure for a linear guideway, the spacer is a unitary structure consisted of a plurality of parting portions, connecting portions and a retaining portion, and is suitable for mass production and can prevent the rollers from skewing and impacting from each other, thus ensuring a smooth operation of the linear guideway.

2. Description of the Prior Arts

With the development of science and technology, and the improvement of the precision feeding system, linear guideway and technology thereof have become a most important part of many precision mechanisms. Various types of linear mechanisms have been and are being widely used in different fields. Although the linear guideway technology is developing fast, still there are some problems of the linear products that need to be improved. Many efforts have been made by the related industry to effectively improve the quality of linear guideway, in particularly, those high precision mechanisms (such as wafer processing equipment and CNC Computer Numeric Control instruments) that need to run stably and silently. Therefore, there are still some blind spots in the existing linear mechanisms that need to be exploited and erased.

The existing linear guideways can generally be divided into three categories:

A. The first type linear guideway as shown in FIG. 1 generally includes a plurality of rollers 10 that are connected by a chain 12. The production of the chain 12 is considered as a core of the mould and comprises the following steps: first, putting the rollers 10 into the male and female moulds, and then ejecting plastic into the moulds. This type of linear guideway (JP Pat. No. 3,436,708 or U.S. Pat. No. 6,626,572) has the following disadvantages:
 1. The number of rollers 10 is in proportion to the length of the chain 12, if the chain 12 is long, the number of rollers 10 should be relatively large, and the production time is relatively long.
 2. Assembling the chain 12 with the rollers 10 is laborsome.
 3. The chain 12 uses a plurality of spacers 11 to separate the rollers 10, the spacers 11 each has two concave contact surfaces for contacting with rollers 10 and the diameter of the concave contact surfaces of the spacers 11 is equal to that of the rollers 10. Therefore, the spacers 11 are in full surface contact with the rollers 10, this will lead to a great friction. And a long time of relative slide between the rollers and the spacer will increase the elastic fatigue of the chain.

B. A second type linear guideway (disclosed by U.S. Pat. No. 3,964,802) as shown in FIG. 2 employs a plurality of spacers 13 to separate the rollers 10, each of the spacers 13 includes two retaining portions 131 to be inserted in the rollers 10, and a pair of strip portions 14 arranged between two neighboring rollers 10 for prevention of metal-slide-induced friction therebetween. The respective spacers 13 are alternatively arranged at either end of the respective pairs of rollers 10, that is to say, each of the rollers 10 is provided with a spacer 13. The disadvantages of this type linear guideway as explained as follows:
 1. The rollers 10 should be formed at either end thereof with a hole for insertion of the retaining portions 131 of the spacers 13, this will not increase the processing cost but also weaken the strength of the rollers 10.
 2. As compared with to the spacer with concave contact surface, the spacer 13 of the second type linear guideway occupies much more spaces of the linear guideway, such that the number of rollers 10 in a given length of linear guideway will be reduced, thus adversely affecting the load capacity and the rigidity of the linear guideway.
 3. The spacers 13 in a line guideway cannot be made at one time but need to be assembled separately, therefore, the assembly is really time consuming.

C. A third type linear guideway (disclosed by U.S. Pat. No. 6,390,678 and JP patent No. 11-351254) as shown in FIG. 3 comprises a conical connecting portion 15 connected between the respective rollers 10 and located along the radial direction of the rollers 10. Each of the rollers 10 is equally divided into halves, and the disadvantages of this type linear guideway as explained as follows:
 1. since the connecting portion 15 is located along the radial direction of the rollers 10, and the radial direction of the roller is the most import loading direction of the linear guideway, it will substantially reduce the contact surface between the rollers and the slide groove of the slide block, and will largely weaken the load capacity and the rigidity of the linear guideway.
 2. In the circulating channel, the conical connecting portion 15 will cause inference to the circulating channel because of weight, thus causing slide friction and affecting the smooth operation of the linear guideway.

The present invention has arisen to mitigate and/or obviate the afore-described disadvantages.

SUMMARY OF TIE INVENTION

The technical problems to be solved:
1. The existing spacers for rollers are generally made by injection molding and formed with a hole in either end thereof so that the manufacturing difficulty and cost is relatively high.
2. It is quite likely to cause unceasing collision of the adjacent rollers in the chain to extend or retract the chain, thus increasing the elastic fatigue.
3. The slide friction is great, affecting the smooth operation of the linear guideway.

The technical features for solving the above problems are described as follows:

The present invention relates to a parallel spacer for a linear guideway, comprising at least one spacer for rollers, a plurality of rollers installed in the spacer, and a linear system. The spacer is integrally formed and includes a retaining portion, a plurality of connecting portions, and a plurality of parting portions. The retaining portion is an integral structure for connection with the respective connecting portions. The connecting portions are equidistantly arranged at one side of the retaining portion, and the distance between each pair of neighboring connecting portions are far greater than the diameter of the rollers. The parting portions are connected with the connecting portions, respectively. Each of the parting portions is a thin member whose length is shorter than that of each of the rollers. On each of two opposite sides of the respective parting portions is formed a Gothic arch-style concave contact surface for accommodation of the rollers. By such arrangements, one side of the spacer for rollers is provided the elongated retaining portion, and the other side of the spacer is in an open state and provided with plural spaces defined by the Gothic arch-style concave contact surfaces and the parting portions. The linear system includes a circulating channel and a groove disposed in at least one side of the circulating channel. The spacer and the rollers are all arranged in the circulating channel, and the retaining portion of the spacer is just located in the corresponding groove. Therefore, the height of the retaining portion is smaller than that of the groove.

The present invention has the following advantages:

The primary objective of the present invention is to provide a parallel spacer for a linear guideway that is a unitary structure suitable for mass production and comprises a plurality of parting portions, connecting portions and a retaining portion. Each of the parting portions is a thin member having a length shorter than the rollers, and the connecting portions are designed to connect the respective pairs of parting portions in a single edge contact fashion.

The secondary objective of the present invention is to provide a parallel spacer for a linear guideway that can operate smoothly, wherein the retaining portion is arranged at a side of the respective rollers and is located in the axial direction thereof, and the height of the retaining is less than that of the groove in the circulating channel of the linear system. The respective rollers are arranged between each pair of two opposite Gothic arch-style concave contact surfaces of the respective parting portions.

The third objective of the present invention is to provide a parallel spacer for a linear guideway, wherein a Gothic arch-style concave contact surface is formed on either side of the respective parting portions for contacting a surface of the respective rollers. This structural design can prevent the rollers from skewing, skipping, friction and impacting, thus substantially reducing the noise caused thereby.

The present invention will become more obvious from the following description when taken in connection with the accompanying drawings, which show, for purpose of illustrations only, the preferred embodiment in accordance with the present invention.

DETAILED DESCRIPTION OF THE PREFERRED EMBODIMENT

Figure 1:
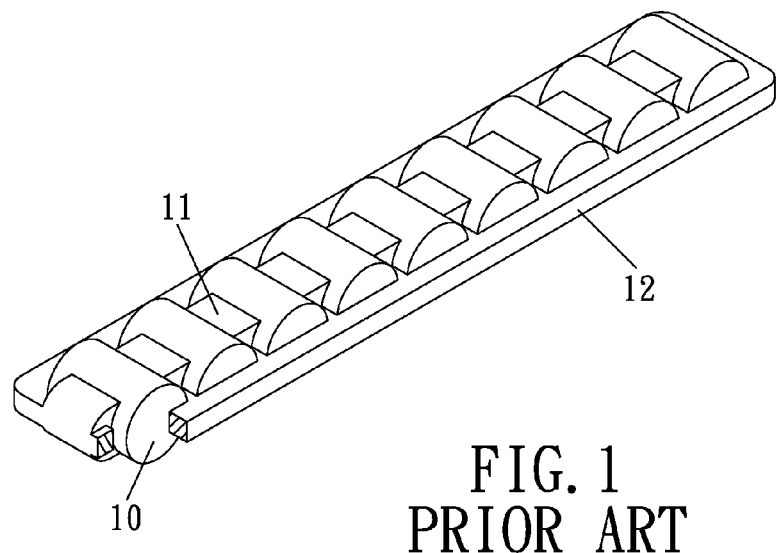
FIG. 1 shows a first type of conventional spacer for a linear guideway.
Figure 2:
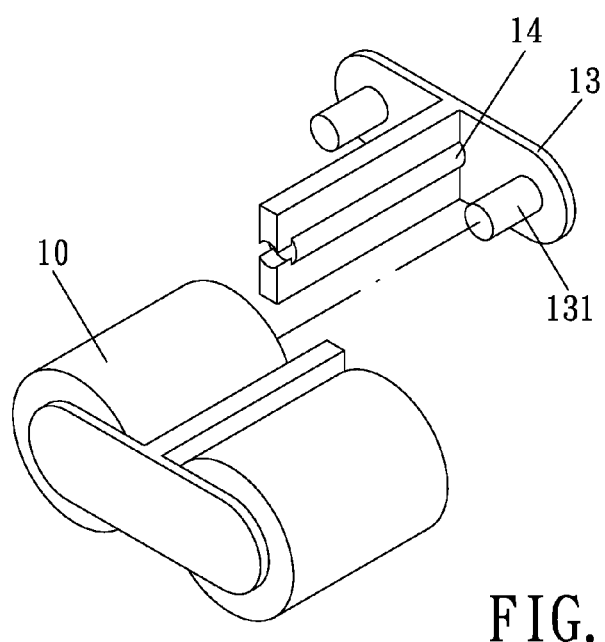
FIG. 2 shows a second type of conventional spacer for a linear guideway.
Figure 3:
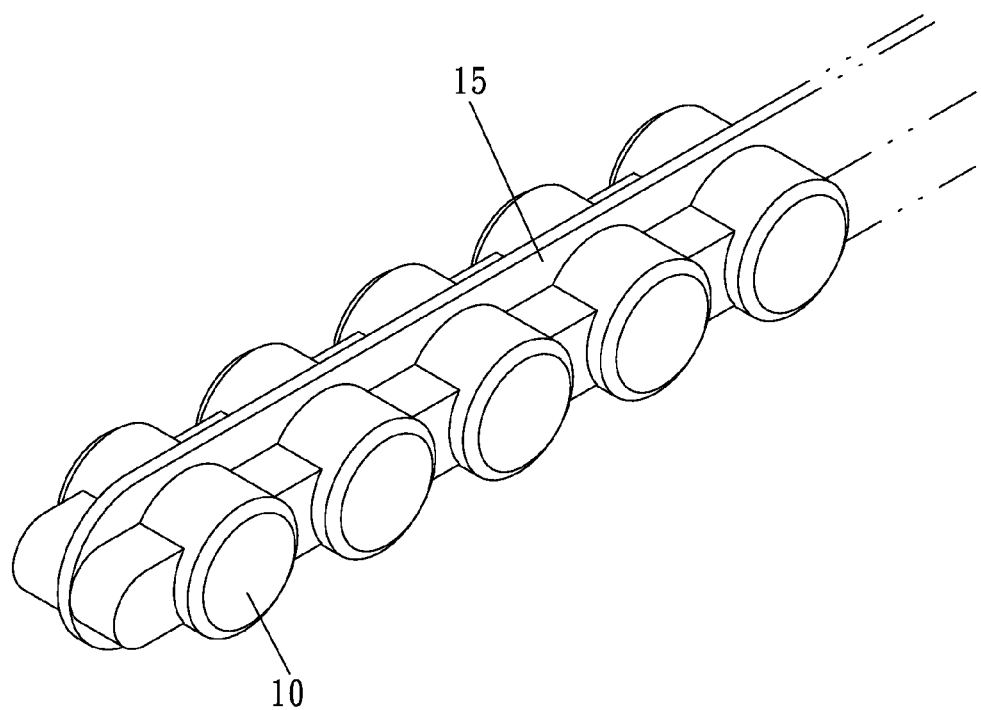
FIG. 3 shows a third type of conventional spacer for a linear guideway.
Figure 4:
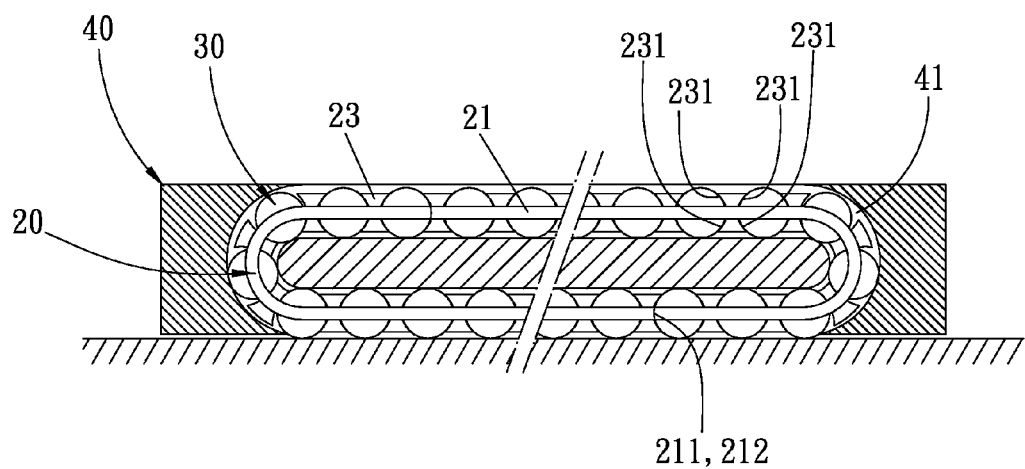
FIG. 4 is an assembly view of a parallel spacer for a linear guideway in accordance with the present invention.
Figure 5:
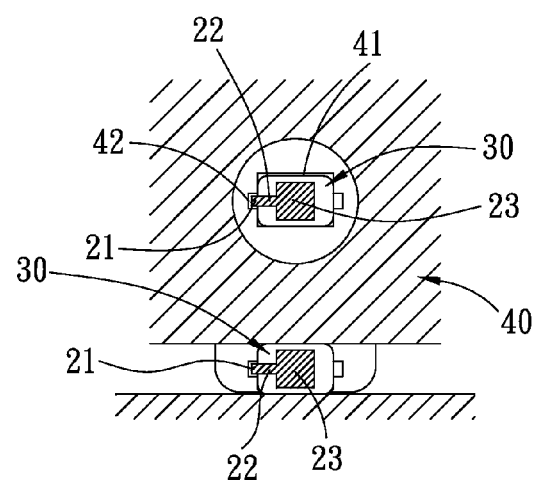
FIG. 5 is a longitudinal cross sectional view of the parallel spacer for the linear guideway in accordance with the present invention.

Referring to FIGS. 4-7, 10-11, a parallel spacer for a linear guideway in accordance with a preferred embodiment of the present invention comprises at least one spacer 20 for rollers, a plurality of rollers 30 installed in the spacer 20, and a linear system 40.

The spacer 20 is integrally formed and includes a retaining portion 21, a plurality of connecting portions 22, and a plurality of parting portions 23.

The retaining portion 21 is an integral structure for connection with the respective connecting portions 22. One end of the retaining portion 21 is formed with an arc-shaped concave portion 211, and the other end of the retaining portion 21 is formed with an arc-shaped convex portion 212.

The connecting portions 22 are equidistantly arranged at one side of the retaining portion 21. The distance between each pair of neighboring connecting portions 22 is far greater than the diameter of the respective rollers 30.

The parting portions 23 are connected with the connecting portions 22, respectively. Each of the parting portions 23 is a thin member whose length is shorter than that of each of the rollers 30. On each of two opposite sides of the respective parting portions 23 is formed a Gothic arch-style concave contact surface 231 for accommodation of the rollers 10.

By such arrangements, one side of the spacer 20 is provided the elongated retaining portion 21, and the other side of the spacer 20 is in an open state and provided with plural spaces defined by the Gothic arch-style concave contact surfaces and the free ends of the parting portions 23. In addition, one end of the spacer 20 is provided with the parting portion 23 connected with the connecting portion 22, and the other end of the spacer 20 is provided with a free end of the retaining portion 21.

The respective rollers 30 are arranged between each pair of opposite Gothic arch-style concave contact surfaces 231. Both sides of the respective arch-style concave contact surfaces 231 are in contact with the rollers 30 while the middle portion of the respective arch-style concave contact surfaces 231 is far from the rollers 30, so as to reduce the contact surface of the rollers 30 relative to the respective arch-style concave contact surfaces 231. The retaining portion 21 is arranged at a side of the respective rollers 30 and is located in the axial direction thereof.

The linear system 40 includes a slide rail 43 and a slide block 44, which is mounted on the slide rail 43 and provided with a slide block 44 at each of two ends thereof. The slide block 44 and the end caps 45 are each interiorly provided with more than one circulating channel 41. The slide rail 43 is provided with a groove 46 in at least one side thereof for cooperating with the circulating channel 41. The circulating channel 41 is provided with a groove 42. The spacer 20 and the rollers 30 are all arranged in the circulating channel 41, and the retaining portion 21 of the spacer 20 is just located in the corresponding groove 42. Therefore, the height of the retaining portion 21 is smaller than that of the groove 42.

The arc-shaped concave portion 211 of the spacer 20 is engaged with the arc-shaped convex portion 212 of the retaining portion 21 of another spacer 20. The arc-shaped convex portion 212 of the spacer 20 is engaged with the arc-shaped concave portion 211 of the retaining portion 21 of another spacer 21.

Figure 6:
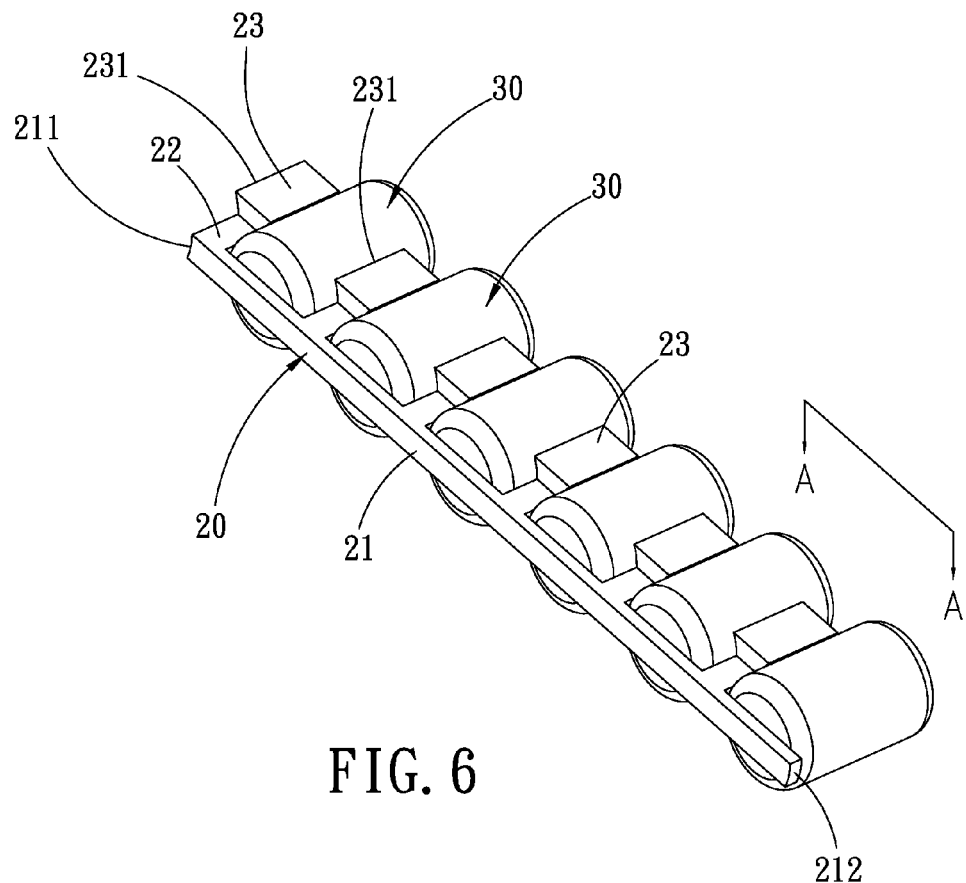
FIG. 6 is an assembly view of the spacer in accordance with the present invention with the rollers.
Figure 7:
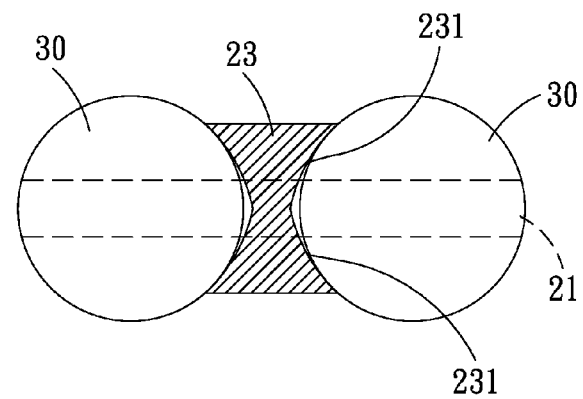
FIG. 7 is a partial enlarged view of FIG. 6 in accordance with the present invention.

As shown in FIGS. 6-7, the connecting portions 22 of the spacer 20 are designed to connect each pair of neighboring parting portions 23 in a single edge contact fashion, and the retaining portion 21 acts as a bridge between the respective connecting portions 22 and the parting portions 23. Since the retaining portion 21 makes the rollers 30 arranged in parallel to each other, the linear guideway will move more smoothly when moving in the return path.

Furthermore, since the height of the retaining portion 21 and that of the connecting portions 22 are minor than that of the groove 42 of the circulating channel 41, it is less likely to cause interference between the groove 42 and the retaining portion 21.

The connecting portions 22 are employed to maintain the position of the retaining portion 21 relative to the respective parting portions 23, thus preventing the slide-induced interference of rollers 30 with the circulating channel 41, and further preventing distortion or fall-off of the parting portions 23.

The connecting portions 22 are arranged at a lateral side of the rollers 30 without reducing the contact surface of the rollers 30 relative to the slide block and without affecting the load capacity and the rigidity of the linear guideway. The connecting portions 22 can shift slightly at the instant the rollers 30 impact the connecting portions 22, thus alleviating the elastic fatigue of the parting portions 23. Similarly, the retaining portion 21 also acts as a buffer between the connecting portions 22 and the parting portions 23, so as to prevent the slide friction between the parting portions 23 and the circulating channel 41.

Figure 8:
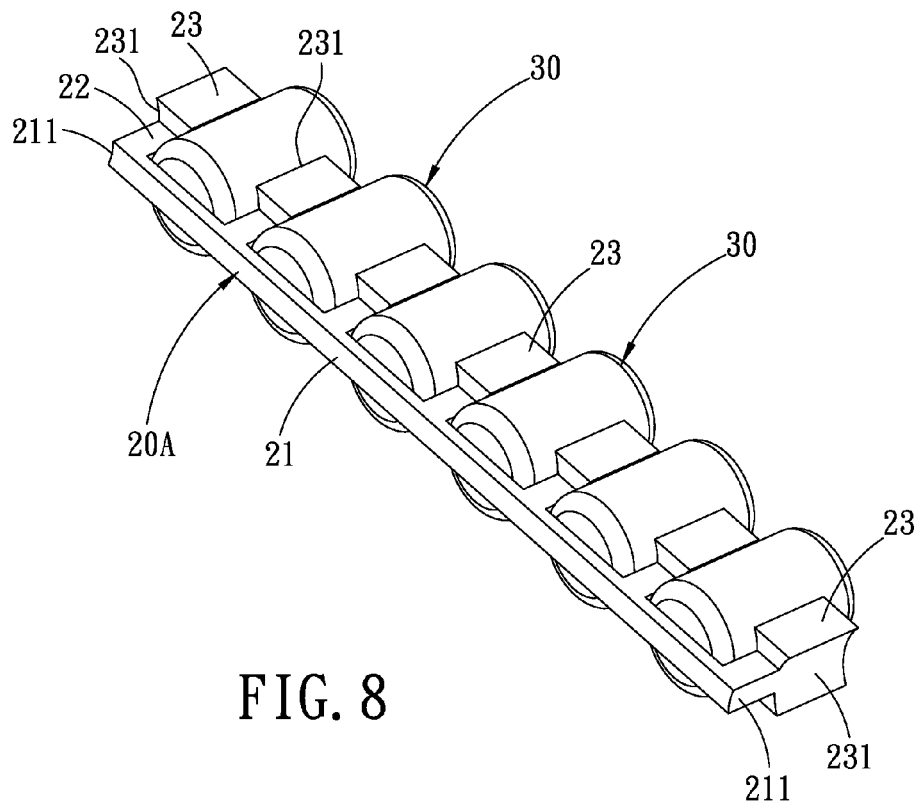
FIG. 8 is an assembly view of another spacer in accordance with the present invention and the rollers.
Figure 9:
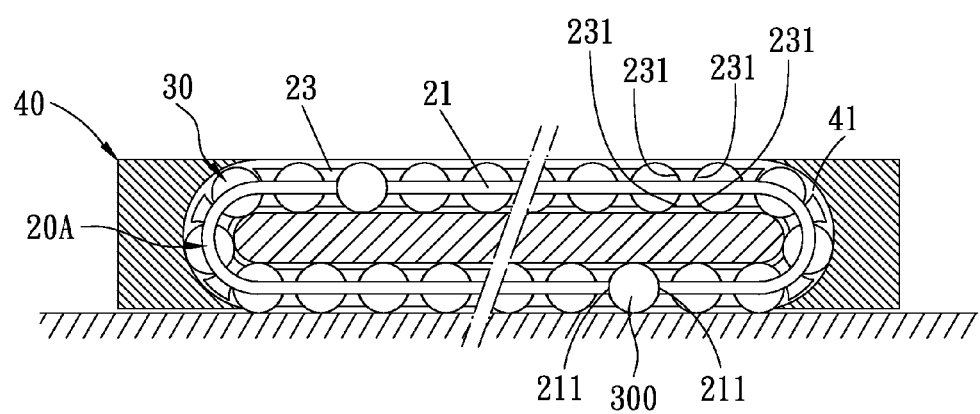
FIG. 9 is a cross-sectional view showing the assembly of the spacer of FIG. 8 in accordance with the present invention
Figure 10:
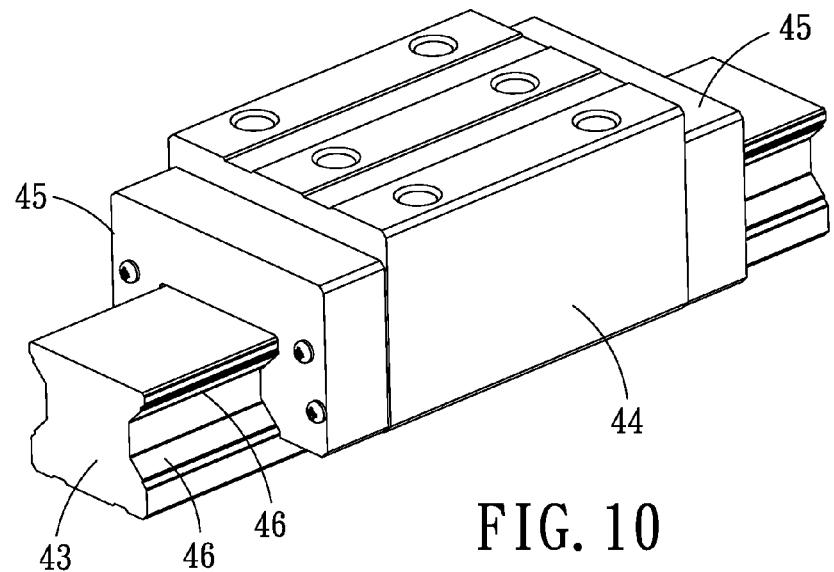
FIG. 10 is a perspective view of a linear system in accordance with the present invention.
Figure 11:
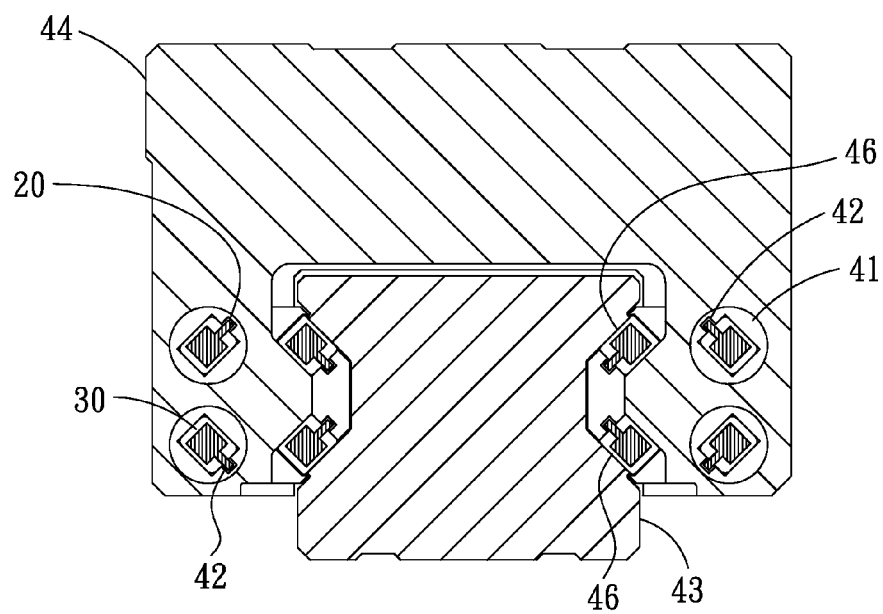
FIG. 11 is a cross-sectional view illustrating the cooperation between the spacer, the rollers and the linear system in accordance with the present invention.

Moreover, with reference to FIGS. 8-9, each of two ends of the spacer 20A can be provided with the parting portion 23 and the connecting portion 22 in such a manner that each of two ends of the spacer 20A has a Gothic arch-style concave contact surface 231 facing outwards and an arc-shaped concave portion 211. As a result, when more than two spacers 20A are arranged in the circulating channel 41 of the linear system 40, between the two spacers 20A is additionally provided a roller 300 in such a manner that the roller 300 is in contact with the two arch-style concave contact surfaces 231.

As known from the above embodiments, the present invention has the following advantages:

The primary objective of the present invention is to provide a parallel spacer 20 for a linear guideway that is a unitary structure suitable for mass production and comprises a plurality of parting portions 23, connecting portions 22 and a retaining portion 21. Each of the parting portions 23 is a thin member having a length shorter than the rollers 30, and the connecting portions 22 are designed to connect the respective pairs of parting portions 23 in a single edge contact fashion.

The secondary objective of the present invention is to provide a parallel spacer for a linear guideway that can operate smoothly, wherein the connecting portions 22 are designed to connect the respective pairs of parting portions 23 in a single edge contact fashion, the retaining portion 21 is arranged at a side of the respective rollers 30 and is located in the axial direction thereof, and the height of the retaining portion 21 is less than that of the groove 42 in the circulating channel 41 of the linear system 40.

The third objective of the present invention is to provide a parallel spacer for a linear guideway, wherein a Gothic arch-style concave contact surface 231 is formed on each of two opposite sides of the respective parting portions 23 for contacting a surface of the respective rollers 30. This structural design can prevent the rollers 30 from skewing, skipping, friction and impacting, thus substantially reducing the noise caused thereby.

While we have shown and described various embodiments in accordance with the present invention, it should be clear to those skilled in the art that further embodiments may be made without departing from the scope of the present invention.

What is claimed is:

1. A linear guide device for a linear guideway comprising at least one spacer, a plurality of rollers and a linear system; wherein:

the spacer is integrally formed and includes a retaining portion, a plurality of connecting portions and a plurality of parting portions; wherein:

the retaining portion is an integral structure for connection with the respective connecting portions;

the connecting portions are equidistantly arranged at a side of the retaining portion, a distance between each pair of neighboring connecting portions is greater than a diameter of the respective rollers;

the parting portions are connected with the connecting portions, and each of the parting portions is a thin member having a length shorter than each of the rollers, a Gothic arch-style concave contact surface is formed on each of two opposite sides of the respective parting portions for accommodation of the respective rollers;

by such arrangements, one side of the spacer is provided with the elongated retaining portion, and the other side of the spacer is in an open state and provided with free ends of the parting portions and spaces defined by each pair of Gothic arch-style concave contact surfaces, in addition, one end of the spacer is provided with the parting portion and the connecting portion, and the other end of the roller is provided with a free end of the retaining portion;

the respective rollers are arranged between each pair of opposite Gothic arch-style concave contact surfaces of the respective parting portions, both sides of the respective Gothic arch-style concave contact surfaces are in contact with the respective rollers while a middle portion of the respective Gothic arch-style concave contact surfaces is far from the respective rollers, so as to reduce a contact surface of the respective Gothic arch-style concave contact surfaces relative to the respective rollers, and the retaining portion is arranged at a side of the respective rollers and located in an axial direction thereof;

the linear system includes a slide rail and a slide block, which is mounted on the slide rail and provided with an end cap at each of two ends thereof, the slide block and the end caps are each provided with more than one circulating channel, the spacer and the rollers are all arranged in the circulating channel, in the circulating channel is formed a groove, and the retaining portion of the spacer is just located in the corresponding groove, therefore, a height of the retaining portion is less than that of the groove.

2. The linear guide device for a linear guideway as claimed in claim 1, wherein one end of the retaining portion is provided with an arc-shaped concave portion, and the other end of the retaining portion is provided with an arc-shaped convex portion.

3. A linear guide device for a linear guideway comprising at least one spacer, a plurality of rollers and a linear system; wherein:

the spacer is integrally formed and includes a retaining portion, a plurality of connecting portions and a plurality of parting portions; wherein:

the retaining portion is an integral structure for connection with the respective connecting portions;

the connecting portions are equidistantly arranged at a side of the retaining portion, a distance between each pair of neighboring connecting portions is greater than a diameter of the respective rollers;

the parting portions are connected with the connecting portions, and each of the parting portions is a thin member having a length shorter than each of the rollers, a Gothic arch-style concave contact surface is formed on each of two opposite sides of the respective parting portions for accommodation of the respective rollers;

by such arrangements, one side of the spacer is provided with the elongated retaining portion, and the other side of the spacer is in an open state and provided with free ends of the parting portions and spaces defined by each pair of Gothic arch-style concave contact surfaces, in addition, each of two ends of the spacer is provided with the parting portion and the connecting portion in such a manner that the two ends of the spacer are each provided with a Gothic arch-style concave contact surface facing outwards;

the respective rollers are arranged between each pair of opposite Gothic arch-style concave contact surfaces of the respective parting portions, both sides of the respective Gothic arch-style concave contact surfaces are in contact with the respective rollers while a middle portion of the respective Gothic arch-style concave contact surfaces is far from the respective rollers, so as to reduce a contact surface of the respective Gothic arch-style concave contact surfaces relative to the respective rollers, and the retaining portion is arranged at a side of the respective rollers and located in an axial direction thereof;

the linear system includes a circulating channel and a groove arranged in at least one side of the circulating channel, the spacer and the rollers are arranged in the circulating channel, and the retaining portion of the spacer is just located in the corresponding groove, therefore, a height of the retaining portion is less than that of the groove.

4. The linear guide device for a linear guideway as claimed in claim 3, wherein each of two ends of the retaining portion is provided with an arc-shaped concave portion.

* * * * *